April 30, 1968  W. S. PAYNE, JR., ETAL  3,380,522
METHOD OF INHIBITING SALINE WATER INTRUSION
INTO FRESH WATER AQUIFERS
Filed June 8, 1965
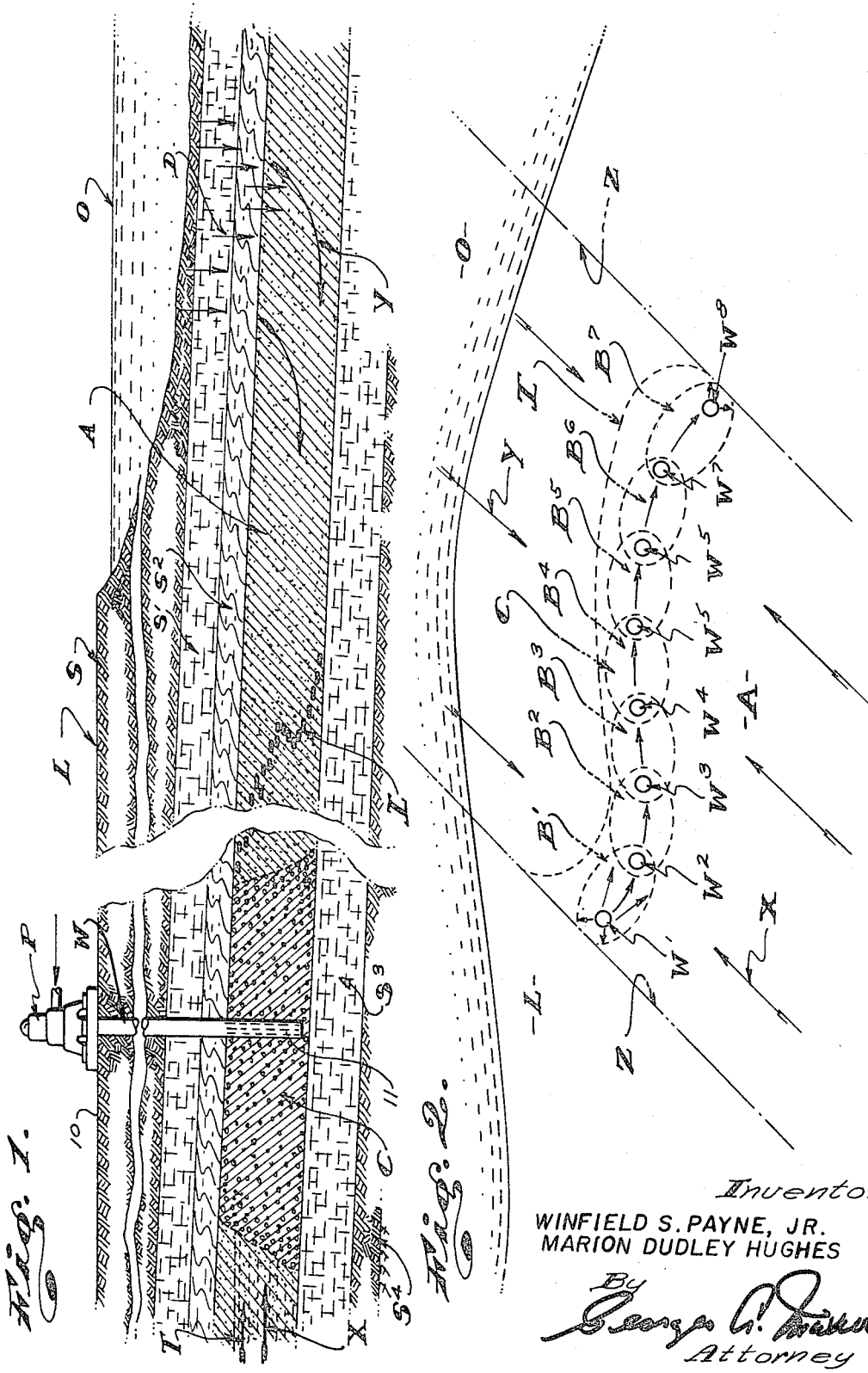
Inventors
WINFIELD S. PAYNE, JR.
MARION DUDLEY HUGHES
By
George A. Mixwell
Attorney

United States Patent Office 3,380,522
Patented Apr. 30, 1968

3,380,522
METHOD OF INHIBITING SALINE WATER
INTRUSION INTO FRESH WATER AQUIFERS
Winfield S. Payne, Jr., c/o Payne Oilfield Equipment Leasing Co., P.O. Box 197, Long Beach, Calif. 90801, and Marion Dudley Hughes, 4420 Myrtle Ave., Long Beach, Calif. 90807
Filed June 8, 1965, Ser. No. 462,190
11 Claims. (Cl. 166—9)

ABSTRACT OF THE DISCLOSURE

The method of stopping the horizontal advance of saline water in a substantially horizontally extending fresh water aquifer between substantially impermeable strata in the earth which comprises, drilling a well into the aquifer in advance of the intruding saline water and then injecting a slurry containing an aggregate of non-toxic granules through the well and into the aquifer under pressure to urge the granules out into the aquifer and into tight bridging engagement with each other and with the strata above and below the aquifer to establish an impermeable bridging mass in the aquifer in advance of the intruding saline water.

---

Throughout the world and particularly along the several sea coasts of the United States fresh water is being pumped from subterranean water bearing formations or aquifers, for agricultural, industrial, and domestic use. In many situations, such fresh water is being used faster than it can be replaced, thereby lowering the water tables and allowing or permitting saline waters from the adjacent oceans and/or seas, leaching through the overburden, to enter the fresh water aquifers and to flow back or landward and to replace the displaced fresh water. The inflowing saline waters mix with the fresh waters, rendering them brackish and unsuitable for use.

The above-noted intrusion of saline water into fresh water aquifers does not ordinarily take place rapidly or uniformly, but rather, is normally a rather slow uneven or un-uniform process.

In some situations, the intrusion of saline water into a fresh water aquifer advances a very short distance during years of drought and is repulsed or driven back and out of the aquifer during wet years. Unfortunately, once saline water has intruded into a fresh water aquifer, it is seldom possible that it can be effectively repulsed and its detrimental effects purged, before years of drought again set in and it again advances; with the result that in an overwhelming majority of situations where saline or salt water intrusion is experienced, such intrusion cannot be corrected and can be expected to advance with the passage of time.

An important factor to be understood when considering the problem of salt water intrusion into fresh water aquifers is the fact that such intrusion occurs when the fresh water level in the aquifers drop. Such a drop in the water level allows the intruding saline water to flow into the aquifer above the still present fresh water and to thereby mix with the fresh water and render it brackish and unsuitable for use.

As a result of the above-noted manner in which saline water intrusion frequently takes place, it will be noted that a relatively small quantity of saline water can intrude a considerable distance into a fresh water aquifer where the water level has lowered a slight amount and in doing so can render an extremely large volume of otherwise fresh water, brackish.

In other situations, where saline water intrusion is experienced, the lowering of the fresh water level in an aquifer does not, in fact, leave a void into which the saline water may flood, but rather, lowers the hydro-static pressure on the fresh water in the aquifer below the hydrostatic head of the saline water, with the result that the saline water, under a greater head, urges the fresh water body back and in doing so mixes therewith, turning the fresh water brackish, and contaminating the aquifer.

In most situations where saline water intrusion is a problem, all of the above-noted causes and effects and certain other causes and effects come into play to a greater or lesser degree.

At present, much money and effort is being expended in an effort to prevent or to control the intrusion of saline water into fresh water aquifers.

Typical of the methods being employed is the sinking of a plurality of pumping wells into the fresh water aquifers, along the line to where the saline water has intruded and the sinking of a plurality of fresh water injection wells into the fresh water aquifer upstream or a head of the line to which the saline water has intruded. By pumping fresh water into the aquifers by means of the injection wells and by extracting a like amount of water from the pumping wells, it is sought to keep that portion of the aquifer between the wells filled with fresh water and to maintain the flow of such water downstream or in opposition to the flow of such intruding saline water, thereby stopping such intrusion.

The above-noted method is being presently employed by the State of California and the Counties of Los Angeles and Orange in said state. To date, the effectiveness of the above-noted method is questionable, as it requires the constant and never-ending injecting of great quantities of fresh water which is in short supply, is expensive, and much of which is lost as a result of contamination. Further, due to the tendency of water to seek out and establish channels in aquifers, it is anticipated that the end result in the above-noted attempt to stop or inhibit saline water intrusion, will be the establishment of outflowing channels of fresh water in the aquifers, between the injection and pumping wells and the continued intrusion of saline water into the aquifers, between the fresh water channels, which intrusion will eventually progress beyond or upstream of the injection wells.

An object of our invention is to provide a novel method of preventing or inhibiting the intrusion of saline water into fresh water aquifers.

Another object of the present invention is to provide or establish subsurface structural cut-offs in a fresh water aquifer extending transverse the direction of flow in the aquifer and between that portion of the aquifer in which saline water has intruded and that portion of the aquifer into which the saline water has not yet intruded.

It is another object of the instant invention to introduce slurries of clay and other solid matter into a fresh water aquifer to plug and seal the interstices in the aquifer and to thereby stop the outflow and loss of fresh water and the inflow of saline water and resulting contamination of the fresh water.

Another object of this invention is to provide a cut-off in a fresh water aquifer which serves to dam the normal outward flow of fresh water therein whereby the water level in the aquifer can be maintained at a sufficient head to overcome and oppose the intrusion of saline water entering the aquifer downstream of the cut-off.

It is another object of this invention to inject slurries of clays and the like into a fresh water aquifer under high pressure so as to fracture the formation and assure wide, extensive and complete distribution of the slurry material into the aquifer.

It is a further object of the invention to inject said slurries into the aquifer under sufficient pressure to lift the overburden and to thereafter relieve such pressure and allow the overburden to settle down and exert its pressure onto the solid matter deposited in the aquifer and so as to establish a tight compacted sealing cut-off structure.

Still another object of this invention is to establish a plurality of wells along a line where it is desired to establish a cut-off in a fresh water aquifer and to introduce slurries of non-water soluble solid matter through the wells and into the aquifer, in the manner set forth above, in sequential order.

Yet another object of our invention is to provide a plurality of aligned wells in the manner set forth above, and to pump water from the next well, as a slurry of solid matter is introduced into each well, whereby the direction of flow and the establishment of the cut-off can be controlled and so that the volume of material required to establish the cut-off can be minimized.

It is recognized that the volume of quantity of clays and other solid matter required to establish a cut-off in accordance with the present invention is considerable. However, at present, the oil producing industry in Southern California and along our other coastlines, where salt water intrusion is being experienced, produces and uses great quantities of circulating fluid or drilling mud. After an oil well is completed, the circulating or drilling mud must be disposed of. At present, in Southern California, adjacent those areas where salt water intrusion is a problem, a great number of oil wells are being drilled. After the wells are completed, the drilling mud is being transported to barges and, thence, taken many miles out to sea to be dumped, as the dump-sites on land which were previously available are now filled. This procedure is extremely inconvenient and costly to the well drilling industry.

It will be noted that the drilling mud used in the establishing of oil wells is composed of bentonite and other similar clays and carries large quantities of cuttings and the like. Accordingly, this material, which becomes a by-product of the oil well drilling industry, is ideal for establishing cut-offs in fresh water aquifers in accordance with the present invention.

An object of our invention is, therefore, to inject and deposit used oil well drilling mud into fresh water aquifers to create cut-offs in the aquifers to stop the intrusion of saline water.

Another readily available and economical source of material for carrying out the present invention is the sedimentary clays and the like on the ocean floor, which clays can be easily and economically dredged and transported through suitable ducting to the sites of injection wells entering fresh water aquifers.

In most coastal areas where salt water intrusion into fresh water aquifers is a problem, the sea or bays which would provide an abundant supply of suitable material for carrying out this invention are so close at hand as to be, in essence, at the site of the injection wells.

Accordingly, it is another object of our invention to dredge clays from the bottom of adjacent seas, bays, and the like, and to inject such clays into a fresh water aquifer to establish a clay cut-off and to stop the intrusion of salt water into the aquifers.

It is a further object of the instant invention to establish slurries for the establishment of cut-offs in the fresh water aquifer, as set forth above, wherein said slurry is composed of an aggregate of clays, sands and/or gravel containing predetermined volumes of clays, sands and gravel of predetermined granule size whereby a substantially impermeable and structurally sound bridging structure and cut-off is established in the aquifer.

The various objects and features of our invention will be fully understood from the following detailed description of typical preferred forms and applications of the invention, throughout which description reference is made to the accompanying drawings, in which:

FIG. 1 is a sectional view of an earth formation having a fresh water aquifer, a body of saline water related thereto and a cut-off established therein in accordance with our invention; and, FIG. 2 is a diagrammatic plan view of the invention illustrating a typical carrying out thereof.

In FIG. 1 of the drawings, we have illustrated a fresh water aquifer A extending longitudinally below the surface of the earth. The aquifer is shown extending downwardly from beneath a land mass L to below an ocean or sea O of saline water. The aquifer is inclined downwardly slightly as it extends outwardly.

The aquifer A may be of any type of water bearing and/or conducting formation, for example, it may be a strata or bed of gravel and/or sand supported by substrata as illustrated at S3 and S4 and is covered by an overburden made up of several super-strata, as illustrated at S, S1 and S2.

The arrows X indicate the normal direction of flow of fresh water in the aquifer.

As illustrated at T, at the left end of the aquifer, the water table or level, has dropped as a result of overproduction or extraction of fresh water or as a result of drought.

At the right hand side of FIG. 1 the arrows D indicate the course of saline water, from the ocean as it leaches through the overburder or super-strata into the aquifer. The arrows Y indicate the upstream course of flow of the saline water in the aquifer.

The downwardly and outwardly inclined pattern of heavy stippling in the aquifer at I, indicate the line to which the saline water has intruded upstream.

In FIG. 2 of the drawings, the parallel diagonal phantom lines Z indicate the sides or lateral limits of the aquifer, which sides may be established by faults or the like in the earth's surface; by the converging of the super- and sub-stratas S2 and S3 or by an adjacent substantially impermeable strata.

The line I of saline intrusion, in FIG. 2 is shown as extending transverse the aquifer in an uneven or irregular manner.

It will be apparent that in the typical situation illustrated in the drawings, and described above, the intrusion or upstream flow of saline water in the aquifer A is caused by or as the result of lowering the water table T in the aquifer to an extent that a void is established therein, into which the saline water is free to flow or the water table is lowered to an extent that the hydrostatic head of pressure on the fresh water drops below the head pressure on the saline water whereby the saline water flows upstream in the aquifer, in opposition to the normal flow of fresh water therein.

The present invention has to do with the establishment of an impermeable or substantially impermeable dam or cut-off C extending transversely in or across the aquifer, that is, transverse the direction or line of flow of water therethrough.

The cut-off C can be an impermeable structure established in the aquifer A to extend from one side thereof to the other, in which case all flow of water in both directions, is stopped and the upstream side is caused to fill with fresh water, or the cut-off C can be in the form of one or more jetties or island-like impermeable structures extending transversely in the aquifer, leaving or defining gates or openings which serve to throttle or bean the outward flow of fresh water to such an extent that the water table in the aquifer, upstream of the cut-off, is kept and maintained up to a sufficient level that a sufficient head pressure is maintained thereon to repulse the intruding saline water.

The damming or cut-off structure C is established in the aquifer by introducing atnd depositing a non-water soluble, non-toxic mineral aggregate into the aquifer, which aggregate is composed of mineral particles or granules of varying size and ranging from granules which are colloidal in size to granules which are of sufficient size to establish bridging engagement in the interstices in the formation of the aquifer. The aggregate is composed of a sufficient number of different sizes of granules and of a sufficient volume of each and every size of granules so that when it is injected and deposited into the formation of the aquifer, a solid, stable and strong impermeable bridging structure is established, which structure is not subject to being washed or flushed out and through the formation, or is such that it will not wash or flush out and through the formation at such a rate as would render the efforts to control the flow of water in the formation ineffective or impractical.

In practice, the aggregate can be composed or made up of suitable clays, such as bentonite clay, sand and/or gravel. In certain circumstances or situations, where other suitable materials, such as crushed sea shells, are available, such materials can be advantageously employed.

The aggregate is mixed with water to establish a slurry which is readily pumpable, but which is not so fluid or thin that it will disburse and flow uncontrolled throughout the aquifer when injected therein.

It will be apparent that in many situations where saline water intrusion into fresh water aquifers is a problem, there are large volumes of clays and sand in the immediate vicinity that can be advantageously employed in carrying out the present invention. For example, sedimentary clays and sands from the bottoms, beds and shores of adjacent oceans, bays, lakes and rivers provide a convenient supply of material which can be dredged up or otherwise collected easily and economically for use in carrying out the invention.

Another source of material for carrying out our invention is used well drilling mud, used by the oil well drilling industry. This mud is engineered to have high shear and low viscosity so that it will readily carry cuttings and the like and yet will flow easily. As a result, drilling fluid or mud is ideal as a base for use in carrying out this invention. Since the oil well drilling industry in certain areas must pay a high cost for disposal of drilling mud, after it has been used, it is contemplated that this industry will, in certain situations, pay those practising this invention to use their used drilling mud.

The slurry thus established is injected into the formation of the aquifer through a suitable well structure W, by means of a pump P. Since the fresh water aquifers which are subject to saline water intrusion are ordinarily relatively closed to the earth's surface, the cost of drilling and establishing wells for injecting the aggregate is quite inexpensive, particularly in light of the conservation of fresh water that is to be effected.

In practice, the well structure W need only involve a well casing 10 extending into the well bore, from the surface of the well, and a liner or screen 11 at the lower end of the casing and extending into the formation of the aquifer to distribute the aggregate therein.

In the preferred carrying out of this invention, and since it is desired to establish the cut-off along a line extending transverse the aquifer, two wells are established, one at one end of the line along which it is desired to establish the cut-off, and the other at the other end of that line. One well is employed to inject the slurry into the formation and the other well is employed to pump water from the aquifer during the injection process, whereby the pressure in the aquifer in and around the second or producing well opposite which the first or injection well is positioned, is lowered and the flow of water in the aquifer in close proximity to the second or producing well flows towards said producing well, thereby inducing and causing the slurry injected into the first or injection well to flow towards said second well. When the second well starts to produce the slurry or a predetermined color thereof it is known that the desired cut-off has been established and the injection process can be stopped.

It will be apparent that the provision of the second producing well, and its use or purpose as set forth above, is effective to reduce the volume of slurry required to a minimum; and in addition to reduce costs and provide a positive means of reading and controlling the carrying out of the method. Subsequently, and as will be apparent from the following the producing well becomes a slurry injection well as the process is carried on.

It will be apparent that the second producing well must be sufficiently close to the injection well to obtain the desired lowering of pressure and the desired direction of flow of the water and slurry in the formation. Accordingly, in situations where it is desired to establish a cutoff of considerable longitudinal extent, a plurality of wells must be established in a series along the line on which it is desired to establish the cut-off.

In FIG. 2 of the drawings, we have shown the cut-off C extending continuously from one side of the aquifer A upstream and substantially parallel with the line L of intrusion.

The cut-off C is established by a plurality of inter-engaging bridging masses B1 through B7, each of which is established in accordance with the foregoing.

In the case illustrated, eight well structures, W1 through W8, are provided along the central longitudinal, transversely extending axis of the cut-off.

The bridging mass B1 is first established by injecting a slurry into well W1 and pumping and producing water from well W2. The bridging mass B2 is next established by injecting a slurry into well W2 while pumping and producing water from well W3. The next bridging mass B3 and, thence, bridging masses B4 through B7 are established sequentially in the same manner.

From the foregoing it will be apparent that a continuous, uninterrupted, impermeable cut-off is effectively established across the aquifer A.

In another form or carrying out of our invention, any one or more, but not all of the bridging masses B1 through B7 shown in FIG. 2 of the drawings, are established in the formation A.

For example, the bridging masses B1, B4 and B7 could be established thereby leaving openings or gates in the cut-off where masses B2–B3 and B5–B6 would otherwise occur and through which a beaned down or throttled volume of fresh water could flow.

In such a situation, wells W1, W2, W4, W5, W7 and W8 would be provided and wells W3 and W6 could be dispensed with.

If desired, only bridging mass B4 could be eliminated, leaving a single, small opening or gate in the cut-off C and in which case, all eight wells would still be necessary.

After the cut-off has been established, in the manner set forth above, the several wells are maintained as observation wells and in the event the cut-off breaks down from time to time, such breakdowns can be readily determined and repaired immediately by injecting slurries into suitable wells.

It is to be understood that the slurries are introduced into the formation under considerable pressure so as to obtain the necessary penetration and to set the particles or granules in the bridging masses with sufficient force so that they are not readily displaced or washed away.

It is contemplated that in certain circumstances, after the pumping well produces a material which indicates the formation has been cut-off by the slurry, the pumping well will be closed and sealed and the pressure at the injection well will be increased sufficiently to lift the overburden and to drive the aggregate deeper and tighter into the formation. Subsequently, this lifting pressure will be relieved by terminating the injection and opening the pumping well. Upon release of the lifting pressure, the overburden settles down upon the bridging mass to hold and maintain it in tight compact engagement in the formation.

In practice, where an open or free-flowing channel or the like is encountered in the aquifer, two adjacent wells can be used for injection purposes, thereby depositing the aggregate at a great and sufficient rate to effect the desired cut-off.

It will be apparent that where a complete cut-off is established, as illustrated in FIG. 2 of the drawings, the fresh water upstream of the cut-off may completely fill the aquifer and establish a sufficient head to blow the cut-off out. To prevent this, observation and pressure relief wells $W^a$, as illustrated in FIGS. 1 and 2 of the drawings, can be provided upstream of the cut-off. The wells $W^a$ would, under these circumstances become artisan wells.

Should the wells $W^a$ fail, or should such wells not be provided and the head pressure in the aquifer, above the cut-off, increase to an extent that it might blow out the cut-off, the several wells W1 and through W8, which wells occur within the cut-off, become pressure relief wells and will relieve such pressure before the cut-off is completely reached.

While we have in FIG. 1 of the drawings shown the cut-off extending between the sub- and super-strata S3 and S2 occurring below and above the aquifer A, it will be apparent that, in practice, particularly in aquifers of great vertical extent or depth, the cut-off or cut-offs need not extend from the lower or sub-strata S3 to the overlying or super-strata S2, but can be established in the aquifer to extend from the lower or sub-strata S3 upwardly a sufficient distance to stop or dam the flow of water in the lower portion thereof, to a sufficient extent to raise the water table to the extent necessary to stop saline water intrusion.

Having described only typical preferred forms and applications or carrying out of our invention, we do not wish to be limited to the specific details herein set forth, but wish to reserve to ourselves any modifications or variations that appear to those skilled in the art and which fall within the scope of the following claims:

Having described our invention, we claim:

1. The method of stopping the horizontal advance of saline water in a substantialy horizontally extending fresh water aquifer between substantially impermeable strata in the earth which comprises, drilling a well into the aquifer in advance of the intruding saline water and then injecting a slurry containing an aggregate of non-toxic granules through the well and into the aquifer under pressure to urge the granules out into the aquifer and into tight bridging engagement with each other and with the strata above and below the aquifer to establish an impermeable bridging mass in the aquifer in advance of the intruding saline water.

2. The method of stopping the horizontal advance of saline water in a fresh water aquifer extending substantially horizontally between substantially impermeable sub- and super-strata in the earth's formation which comprises, drilling a well through the super-strata into the aquifer in advance of the intruding saline water and then injecting a slurry containing an aggregate of non-toxic granules through the well into the aquifer under high pressure to lift the super-strata and to urge the granules out into the aquifer and into tight bridging engagement with each other and with the formation of the aquifer and into engagement with the sub- and super-strata, then relieving the pressure to permit the super-strata to settle and to thereby establish a tight compacted impermeable bridging mass in the aquifer in advance of the intruding saline water.

3. The method of stopping or inhibiting the intrusion of saline water in a fresh water aquifer which comprises, drilling an injection well into the aquifer in advance of the intruding saline water, drilling a pumping well into the aquifer in advance of the intruding saline water and spaced laterally from the injection well, then pumping water from the aquifer through the pumping well and simultaneously injecting a slurry containing an aggregate of non-toxic granules through the injection well into the aquifer under pressure to urge the granules into the aquifer and into bridging engagement with each other and with the formation of the aquifer, and until the production of the pumping well contains a predetermined quantity of the slurry, then stopping pumping and injection to leave an impermeable bridging mass in the aquifer in advance of the intruding saline water and along a line between the wells.

4. The method of stopping the intrusion of saline water in a fresh water aquifer which includes, drilling an injection well into the aquifer in advance of the intruding saline water, drilling a pumping well in the aquifer in advance of the intruding saline water and spaced laterally from the injection well, then pumping water from the pumping well and simultaneously injecting a slurry containing an aggregate of non-toxic granules through the injection well into the aquifer under pressure and until the production of the pumping well contains a predetermined quantity of the slurry, then stopping sealing the pumping well, then increasing the pressure at the injection well to lift the overburden and to urge the granules injected into the formation of the aquifer into tight bridging engagement with each other and with the said formation, then relieving the pressure to permit the overburden to settle and to thereby establish a tight, compacted impermeable bridging mass in the aquifer in advance of the intruding saline water and along a line between the wells.

5. The method of stopping the horizontal advance of saline water in a fresh water aquifer extending substantially horizontally between substantially impermeable super- and sub-strata in the earth's formation which comprises, drilling a well through the super-strata and into the aquifer in advance of the intruding saline water and then injecting a slurry composed of reclaimed oil well drilling mud and an aggregate composed of non-toxic granules through the well and into the aquifer under pressure to urge the granules out into the aquifer and into tight bridging engagement with each other, with the formation of the aquifer and into engagement with the sub- and super-strata to establish an impermeable bridging mass in the aquifer in advance of the intruding saline water.

6. The method of stopping the horizontal advance of saline water in a fresh water aquifer extending substantially horizontally between substantially impermeable sub- and super-strata in the earth's formation which comprises, drilling a well through the super-strata and into the aquifer in advance of the intruding saline water and then injecting a slurry composed of reclaimed oil well drilling mud and an aggregate composed of non-toxic granules through the well into the aquifer under high pressure to lift the super-strata and to urge the granules out into the aquifer and into tight bridging engagement with each other with the formation of the aquifer, and into engagement with the sub- and super-strata, then relieving the pressure to permit the super-strata to settle and to thereby establish a tight compacted impermeable bridging mass in the aquifer in advance of the intruding saline water.

7. The method of stopping the intrusion of saline water in a fresh water aquifer which comprises, drilling an injection well into the aquifer in advance of the intruding saline water, drilling a pumping well into the aquifer in advance of the intruding saline water and spaced laterally from the injection well, then injecting a slurry composed of reclaimed oil well drilling mud and an aggregate composed of non-toxic granules through the injection well into the aquifer under pressure to urge the granules into the aquifer and into bridging engagement with each other and with the formation of the aquifer, and until the production of the pumping well contains a predetermined quantity of the slurry, then stopping pumping and injection to leave an impermeable bridging mass in the aquifer in advance of the intruding saline water and along a line between the wells.

8. The method of stopping the intrusion of saline water in a fresh water aquifer which includes, drilling an injection well into the aquifer in advance of the intruding saline water, drilling a pumping well in the aquifer in advance of the intruding saline water and spaced laterally from the injection well, then injecting a slurry composed of reclaimed oil well drilling mud and an aggregate composed of non-toxic granules through the injection well into the aquifer under pressure and until the production of the pumping well contains a predetermined quantity of the slurry, then stopping and sealing the pumping well, then increasing the pressure at the injection well to lift the overburden and to urge the granules injected into the formation of the aquifer into tight bridging engagement with each other and with the said formation, then relieving the pressure to permit the overburden to settle and to thereby establish a tight, compacted impermeable bridging mass in the aquifer in advance of the intruding saline water and along a line between the wells.

9. The method of stopping the horizontal advance of saline water into a fresh water aquifer extending substantially horizontally between substantially impermeable sub- and super-strata in the earth's formation which comprises drilling a well through the super-strata and into the aquifer in advance of the intruding saline water, then injecting a slurry containing a bridging aggregate of non-toxic granules through the well to the bottom of the aquifer and until an impermeable bridging mass in contact with the sub-strata is built up in the formation of the aquifer to dam outflowing fresh water and to raise the water level in the aquifer in advance of the saline water to an extent that the level of fresh water in the aquifer is higher than the level of the saline water in the aquifer.

10. The method of stopping the horizontal advance of saline water in a fresh water aquifer extending substantially horizontally between substantially impermeable sub- and super-strata in the earth's formation which comprises drilling a series of wells through the super-strata and into the aquifer in spaced relationship and in advance of the advance line of the intruding saline water, then injecting a slurry containing a bridging aggregate of non-toxic granules through each of the wells to the bottom of the aquifer and until the adjacent slurries join and an impermeable bridging mass is built up in the formation of the aquifer and between the sub- and super-strata to dam the outflowing fresh water and to raise the water level in the aquifer in advance of the saline water to an extent that the hydrostatic head pressure on the fresh water is greater than the pressure on the saline water.

11. The method of stopping the intrusion of saline water in a fresh water aquifer which comprises drilling a series of wells into the aquifer in spaced relationship along a line substantially parallel with and in advance of the advance line of the intruding saline water, then injecting a slurry containing a bridging aggregate of non-toxic granules through a first well of the series of wells and into the bottom of the aquifer and simultaneously pumping water from a second well adjacent the first well to induce and cause the slurry to flow into the formation of the aquifer along the line in which the wells are arranged and until the production of the second well contains a predetermined quantity of the slurry, then stopping injection in the first well, commencing injection of slurry into the second well and simultaneously pumping water from the aquifer from a next adjacent well and until the production of the said next adjacent well produces a predetermined quantity of the slurry and continuing the above steps progressively along the series of wells and until an impermeable bridging mass is established in the formation of the aquifer along the line of wells to dam outflowing fresh water and to raise the level of the fresh water in the aquifer to an extent that the hydrostatic head pressure on the fresh water is greater than the pressure on the saline water.

References Cited
UNITED STATES PATENTS

| | | | |
|---|---|---|---|
| 3,195,633 | 7/1965 | Jacob | 166—45 X |
| 3,228,470 | 1/1966 | Papaila | 166—42 X |
| 3,233,673 | 2/1966 | Spain et al. | 166—42 |

STEPHEN J. NOVOSAD, *Primary Examiner.*